US011365072B2

(12) United States Patent
Porath

(10) Patent No.: US 11,365,072 B2
(45) Date of Patent: Jun. 21, 2022

(54) EQUIPMENT LOADING ASSEMBLY

(71) Applicant: Jason Porath, Lynnwood, WA (US)

(72) Inventor: Jason Porath, Lynnwood, WA (US)

( * ) Notice: Subject to any disclaimer, the term of this patent is extended or adjusted under 35 U.S.C. 154(b) by 0 days.

(21) Appl. No.: 17/469,987

(22) Filed: Sep. 9, 2021

(65) Prior Publication Data

US 2022/0073293 A1    Mar. 10, 2022

Related U.S. Application Data

(60) Provisional application No. 63/076,584, filed on Sep. 10, 2020.

(51) Int. Cl.
*B62B 1/10* (2006.01)
*B62B 1/26* (2006.01)
*B65G 67/20* (2006.01)

(52) U.S. Cl.
CPC ............... *B65G 67/20* (2013.01); *B62B 1/10* (2013.01); *B62B 1/26* (2013.01)

(58) Field of Classification Search
CPC .. B65G 67/20; B62B 1/02; B62B 1/04; B62B 1/08; B62B 1/10; B62B 1/26
See application file for complete search history.

(56) References Cited

U.S. PATENT DOCUMENTS

| | | |
|---|---|---|
| 2,346,649 A | 4/1944 | Bilek |
| 3,627,158 A | 12/1971 | Kobasic |
| 6,152,462 A | 11/2000 | Barrett |
| 7,815,215 B1 | 10/2010 | Lowe |
| 9,238,894 B1 * | 1/2016 | Campos ................ E01H 5/061 |

OTHER PUBLICATIONS

"Mecete Stair Climbing Cart Portable Climbing Cart 330 lb Largest Capacity All Terrain Stair Climbing Hand Truck Heavy Duty with 6 Wheels (Black) Baking Varnish Surface Shining," Amazon.com. https://www.amazon.com/gp/product/B074SGT7W9/ref=as_li_tl?imprToken=fX3O9LEzvYj.EiZ63Trkbw&slotNum=25&ie=UTF8&tag=biip_120418_incipio-canarby-case-review-20&camp=1789&creative=9325&linkCode=w61&creativeASIN=B074SGT7W9&linkId=9341825b978950f3eab1980e1727a20c [Date accessed: Jun. 12, 2020].

* cited by examiner

*Primary Examiner* — Bryan A Evans
(74) *Attorney, Agent, or Firm* — Houda El-Jarrah; Bold IP, PLLC

(57) ABSTRACT

An equipment loading assembly for supporting and facilitating the loading of electronic equipment from a first position (e.g., from resting on the ground) to a second position (e.g., into a truck or automobile), and the subsequent unloading of the equipment from the first position to the second position is provided. The equipment loading assembly includes an upright back support structure and a lower support structure extending laterally outward from a lower portion the upright back support structure. The upright back support structure includes one or more stops to prevent the electronic equipment from sliding in a vertical direction, and the lower support structure includes one or more front feet to prevent the electronic equipment from sliding in a horizontal direction. The loading assembly also may include a wheel support structure that enables one or more wheels to engage with a ground surface for rolling the loading assembly.

20 Claims, 8 Drawing Sheets

EQUIPMENT LOADING ASSEMBLY

CROSS-REFERENCE TO RELATED APPLICATIONS

This application claims priority to U.S. Provisional Application No. 63/076,584 filed Sep. 10, 2020, the entire contents of which are hereby fully incorporated herein by reference for all purposes.

FIELD OF THE INVENTION

This invention relates to equipment loading assemblies, including loading assemblies for electronic equipment.

BACKGROUND

Sellers of electrical equipment are oftentimes required to travel with the equipment and to perform demonstrations of the equipment's features and functionalities to potential buyers. However, the equipment may typically be large and unwieldy, making it difficult for a single person to load and unload the equipment in and out of his/her truck or car in order to travel to the customer's location.

Accordingly, there is a need for an equipment loading assembly that facilitates the loading and unloading of equipment into and out of trucks, automobiles, and other vehicles.

SUMMARY

According to one aspect, one or more embodiments are provided below for a loading assembly comprising a first upright support arm including a first end and a second end, and a second upright support arm including a third end and a fourth end, the first and second upright support arms coupled together by at least one connection beam, a first rear facing lever coupled to the first end of the first upright support arm, and a second rear facing lever coupled to the third end of the second upright support arm, a first stop coupled with a forward facing surface of the first upright support arm and located towards the first upright support arm's first end, and a second stop coupled with a forward facing surface of the second upright support arm and located towards the second upright support arm's third end. The invention may further include a first lower support arm including a first proximal end and a first distal end, the first proximal end coupled to the second end of the first upright support arm, and a second lower support arm including a second proximal end and a second distal end, the second proximal end coupled to the fourth end of the second upright support arm, a first foot coupled to the first distal end of the first lower support arm and extending upward, and a second foot coupled to the second distal end of the second lower support arm and extending upward, and a handle coupled between the first foot and the second foot, wherein the loading assembly is adapted to receive a piece of equipment onto its first and second lower support arms.

In another embodiment, the first lower support arm extends away from the first upright support arm at an angle of 70° to 110° with respect to the first upright support arm, and/or the second lower support arm extends away from the second upright support arm at an angle of 70° to 110° with respect to the second upright support arm.

In another embodiment, the first and second upright support arms are aligned and parallel with respect to one another.

In another embodiment, the loading assembly further comprises a first rear facing convex surface at a junction of the first upright support arm and the first lower support arm and/or a second rear facing convex surface at a junction of the second upright support arm and the second lower support arm, the first and/or second rear facing convex surfaces having a corner radius of at least 4 inches.

In another embodiment, the first upright support arm includes a first width towards its first end and a second width towards its second end and the second width is greater than the first width, and/or the second upright support arm includes a third width towards its third end and a fourth width towards its fourth end and the fourth width is greater than the third width.

In another embodiment, the first lower support arm includes a first height towards its first proximal end and a second height towards its first distal end and the second height is greater than the first height, and/or the second lower support arm includes a third height towards its second proximal end and a fourth height towards its second distal end and the fourth height is greater than the third height.

In another embodiment, the first height forms a first cavity opposite the first rear facing convex surface, and the third height forms a second cavity opposite the second rear facing convex surface.

In another embodiment, the loading assembly further comprises a wheel assembly coupled to the first upright support arm and/or the second upright support arm.

In another embodiment, the wheel assembly includes a first wheel support arm including a first proximal end rotatably coupled to the first upright support arm and a first distal end extending away from the first upright support arm, a first wheel rotatably coupled to the first distal end, a second wheel support arm including a second proximal end rotatably coupled to the second upright support arm and a second distal end extending away from the second upright support arm, and a second wheel rotatably coupled to the second distal end, wherein the first and second wheel support arms are adapted to transition from a lower position that places the first and second wheels in engagement with a ground surface to an upper position that places the first and second wheels in non-engagement with the ground surface.

In another embodiment, the first and second wheels are rotatably coupled to the first and second distal ends of the first and second wheel support arms, respectively, by an axle.

In another embodiment, the first wheel is separated from an outer surface of the first distal end of the first wheel support arm by a first gap, and/or the second wheel is separated from an outer surface of the second distal end of the second wheel support arm by a second gap, wherein the first gap substantially equals a first width of the first upright support arm, and/or the second gap substantially equals a second width of the second upright support arm.

In another embodiment, the upper position of the first wheel support arm places the first width of the first upright support arm within the first gap, and/or the upper position of the second wheel support arm places the second width of the second upright support arm within the second gap.

According to another aspect, one or more embodiments are provided below for a loading assembly comprising a first upright support arm including a first end and a second end, and a second upright support arm including a third end and a fourth end, the first and second upright support arms coupled together by at least one connection beam, a first rear facing lever coupled to the first end of the first upright support arm, and a second rear facing lever coupled to the third end of the second upright support arm, a first stop coupled with a forward facing surface of the first upright support arm and located towards the first upright support arm's first end, and a second stop coupled with a forward facing surface of the second upright support arm and located towards the second upright support arm's third end, a first lower support arm including a first proximal end and a first distal end, the first proximal end coupled to the second end of the first upright support arm, and a second lower support arm including a second proximal end and a second distal end, the second proximal end coupled to the fourth end of the second upright support arm, a handle coupled between the first distal end of the first lower support arm and the second distal end of the second lower support arm, a wheel assembly comprising a first wheel support arm including a first proximal end rotatably coupled to the first upright support arm and a first distal end extending away from the first upright support arm, a first wheel rotatably coupled to the first distal end, a second wheel support arm including a second proximal end rotatably coupled to the second upright support arm and a second distal end extending away from the second upright support arm, and a second wheel rotatably coupled to the second distal end, wherein the first and second wheel support arms are adapted to transition from a lower position that places the first and second wheels in engagement with a ground surface to an upper position that places the first and second wheels in non-engagement with the ground surface, and wherein the loading assembly is adapted to receive a piece of equipment onto its first and second lower support arms.

In another embodiment, the loading assembly further comprises a first foot coupled to the first distal end of the first lower support arm and extending upward, and a second foot coupled to the second distal end of the second lower support arm and extending upward.

In another embodiment, the first lower support arm extends away from the first upright support arm at an angle of 70° to 110° with respect to the first upright support arm, and/or the second lower support arm extends away from the second upright support arm at an angle of 70° to 110° with respect to the second upright support arm.

In another embodiment, the loading assembly further comprises a first rear facing convex surface at a junction of the first upright support arm and the first lower support arm and/or a second rear facing convex surface at a junction of the second upright support arm and the second lower support arm, the first and/or second rear facing convex surfaces having a corner radius of at least 4 inches.

In another embodiment, the first lower support arm includes a first height towards its first proximal end and a second height towards its first distal end and the second height is greater than the first height, and/or the second lower support arm includes a third height towards its second proximal end and a fourth height towards its second distal end and the fourth height is greater than the third height.

In another embodiment, the first height forms a first cavity opposite the first rear facing convex surface, and the third height forms a second cavity opposite the second rear facing convex surface.

In another embodiment, the first wheel is separated from an outer surface of the first distal end of the first wheel support arm by a first gap, and/or the second wheel is separated from an outer surface of the second distal end of the second wheel support arm by a second gap, wherein the first gap substantially equals a first width of the first upright support arm, and/or the second gap substantially equals a second width of the second upright support arm.

In another embodiment, the upper position of the first wheel support arm places the first width of the first upright support arm within the first gap, and/or the upper position of the second wheel support arm places the second width of the second upright support arm within the second gap.

Other aspects and advantages of the invention will be apparent from the following description and the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

In general, the equipment loading assembly according to exemplary embodiments hereof includes an assembly for supporting and facilitating the loading of electronic equipment from a first position (e.g., from resting on the ground) to a second position (e.g., into a truck or automobile), and the subsequent unloading of the equipment from the first position to the second position. Electronic equipment is oftentimes large and unwieldy, making it difficult for a single person to load and unload the equipment into and out of a truck or car. The loading assembly is adapted to provide a support structure necessary to facilitate this activity.

Figure 1:
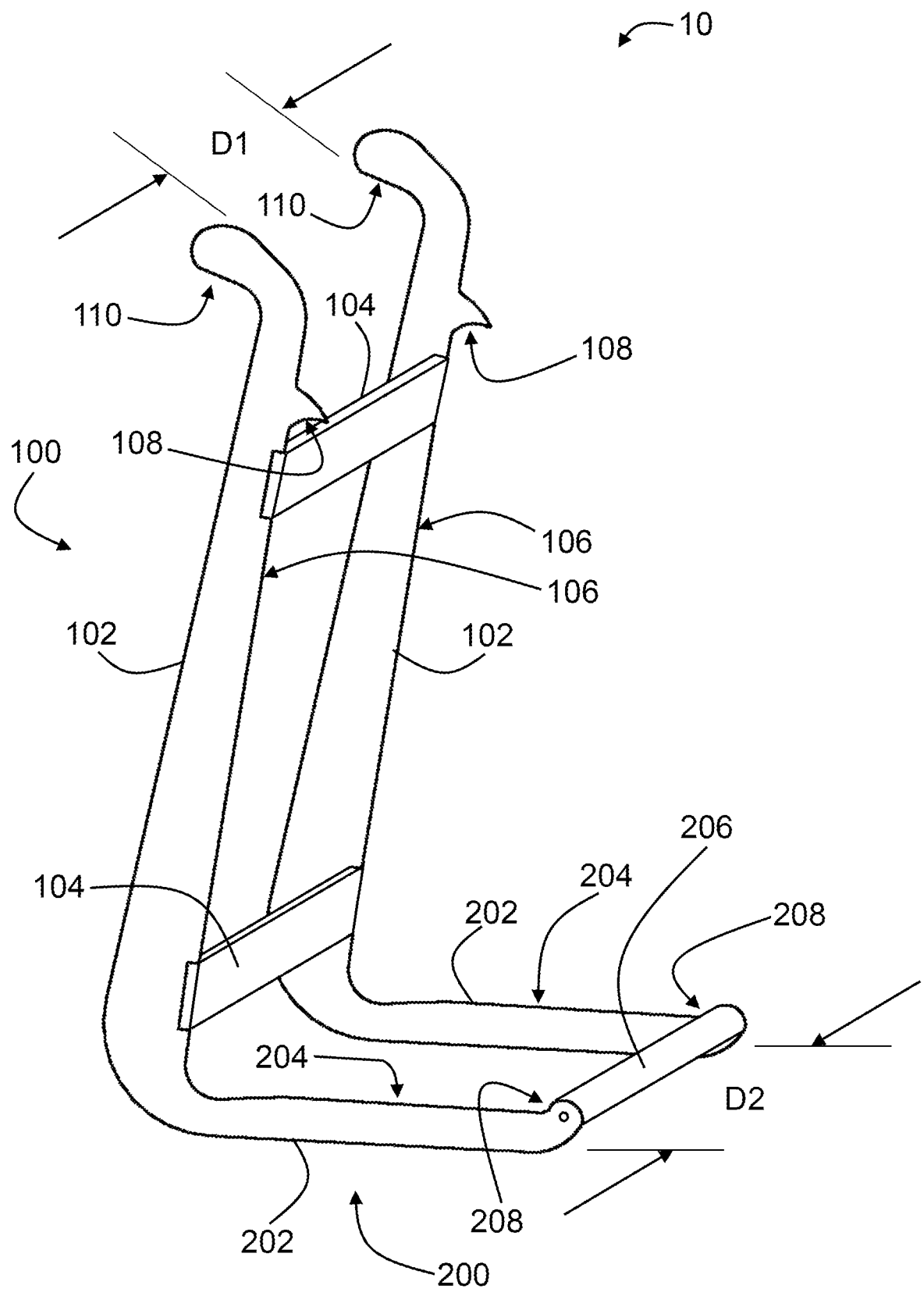
FIG. 1 shows aspects of an equipment loading assembly according to exemplary embodiments hereof.

In one exemplary embodiment hereof, as shown in FIG. 1, the loading assembly 10 includes a back support structure 100 and a lower support structure 200. In general, the back support structure 100 is generally upright and the lower support structure 200 extends laterally outward (e.g., approximately perpendicularly) from the lower portion of the back support structure 200. Optionally, the loading assembly 10 also may include a wheel assembly 300 (see FIG. 4).

Figure 2:
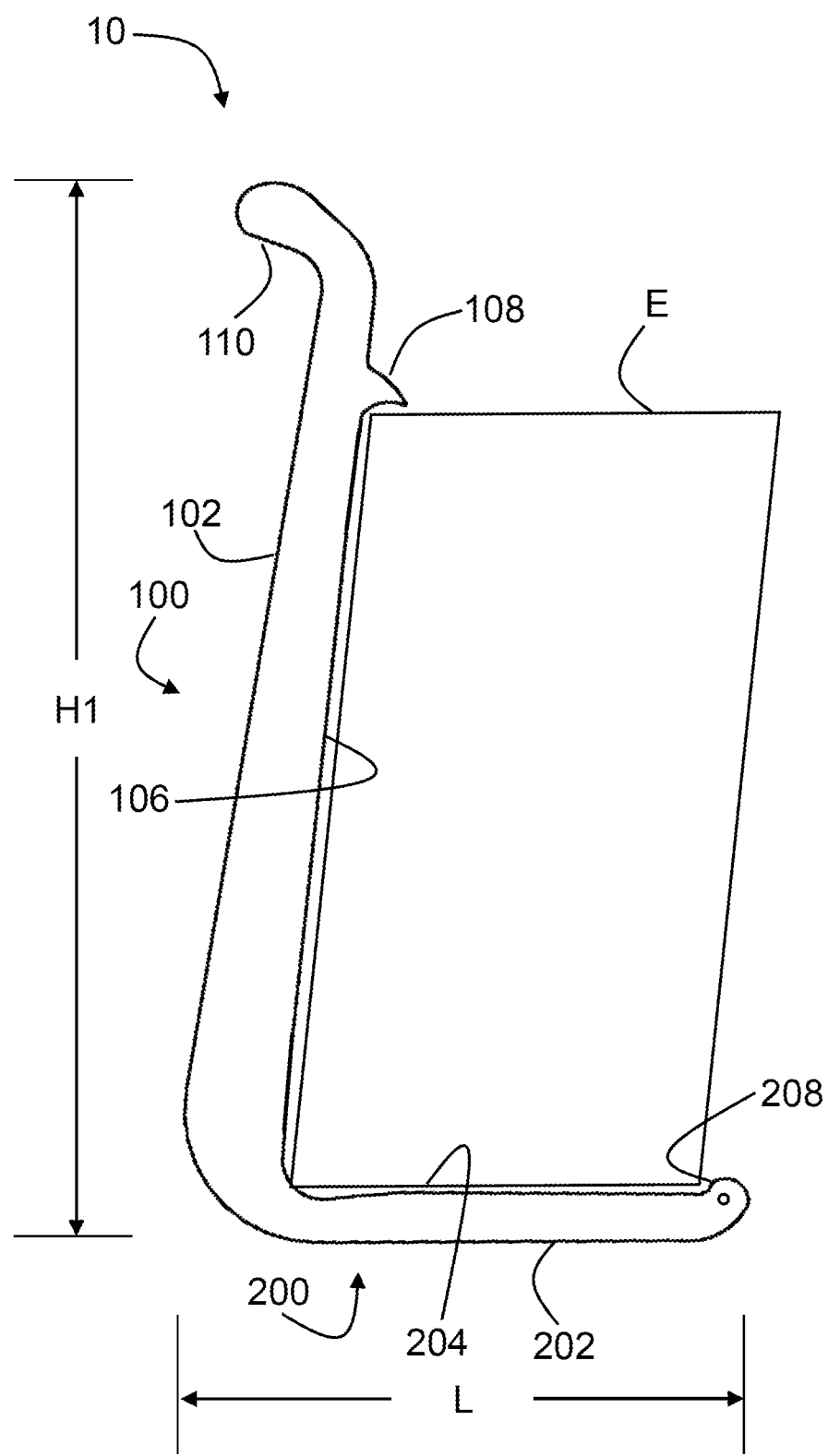
FIG. 2 shows aspects of an equipment loading assembly holding equipment according to exemplary embodiments hereof.

In general, as shown in FIG. 2, the back support structure 100 is adapted to support an upright portion of a piece of equipment E (e.g., the back or any upright side of the equipment E) and the lower support structure 200 is adapted to support a lower portion of the equipment E (e.g., the bottom of the equipment E). The lower support structure 200 may be generally coupled with a lower portion (e.g., the bottom) of the back support structure 100 to form the overall assembly 10. The assembly 10 may include other elements as necessary for it to perform its functionalities as described herein.

As will be described herein, with the equipment E loaded onto the loading assembly 10, the loading assembly 10 facilitates the backward tilting (pivoting or rocking) of the equipment E about the assembly's 10's rear lower corner without the need for wheels or other types of rotating mechanisms, the placement of the back support structure 100 at a forward ledge of a platform (e.g., a trunk or truck bed), the lifting of the equipment E onto the platform, and the sliding of the equipment E to a desired position on the platform. The assembly 10 also facilitates the removal of the equipment E from the platform by reversing the order of the steps described.

For the purposes of this specification, the loading assembly 10 will be described predominantly with respect to the supporting and facilitating the loading and unloading of a CEREK® Acquisition Unit (the equipment E). As is known in the art, the CEREK® Acquisition Unit facilitates the onsite production of dental crowns at dentist offices. During sales and marketing efforts to sell this unit to dentists, a salesperson is oftentimes required to bring the unit to the office for demonstration purposes, to remove the demonstration unit from the office, and to then bring the unit to additional offices. However, the CEREK® Acquisition Unit is large and unwieldy, and difficult for a single person to lift and load into his/her automobile trunk or truck bed. The loading assembly 10 is specifically designed to support the CEREK® Acquisition Unit and its specific form and shape, to facilitate the loading of the unit into a car trunk or onto a truck bed, to enable the easy sliding of the unit to a preferred position within the trunk or truck bed, and the easy removal of the unit as required. Because the assembly 10 may be designed specifically for the CEREK® Acquisition Unit, the assembly 10 is small, compact, lightweight, and without unnecessary features that other types of loading apparatuses (e.g., rolling dollies) may include (such as large wheels, handles, etc.). This enables the assembly 10 to be easily manipulated and to fit in small areas for stowage. In addition, however, it is understood that the loading assembly 10 may be used to support and facilitate the loading and unloading of any piece of equipment and that the scope of the assembly 10 is not limited in any way by the type of equipment it may be used to support.

In some embodiments as shown in FIG. 1, the back support structure 100 includes one or more generally upright arms 102 configured side-by-side and aligned parallel with one another. The aligned arms 102 may be coupled using one or more cross beams 104 adapted to attach the arms 102 together and to hold them at a separation distance D1. While two arms 102 are depicted in FIG. 1, the assembly 10 may include one arm 102, three arms 102, four arms 102, or more. It is preferable that the arms 102 are generally identical to one another, but this may not be required.

In some embodiments, each upright arm 102 includes a front side 106 adapted to engage with an upright portion of the equipment E (e.g., the equipment's back side) when in use.

In some embodiments as shown in FIGS. 1-2, at least one upright arm 102 (and preferably both upright arms 102) includes an upper hook or stop 108 adapted to engage a top edge of the equipment E when an upright portion of the equipment E is engaged with each arm's front side 106 during use. In some embodiments, the stop 108 may include a downward pointing tip forming a concave inner cavity. In this way, each stop 108 may prevent the equipment E from moving along the arm 102 past the stop 104. This will be explained in further detail in other sections.

In some embodiments as shown in FIGS. 1-2, the top portion of at least one upright arm 102 (and preferably both upright arms 102) includes a rear extending lever 110. As will be described in other sections, each rear extending lever 110 is adapted to engage the top surface (or top front edge) of an upper platform (e.g., the top surface of a truck bed or the front lip of an automobile truck space) to facilitate the loading of the assembly 10 thereon.

Figure 3:
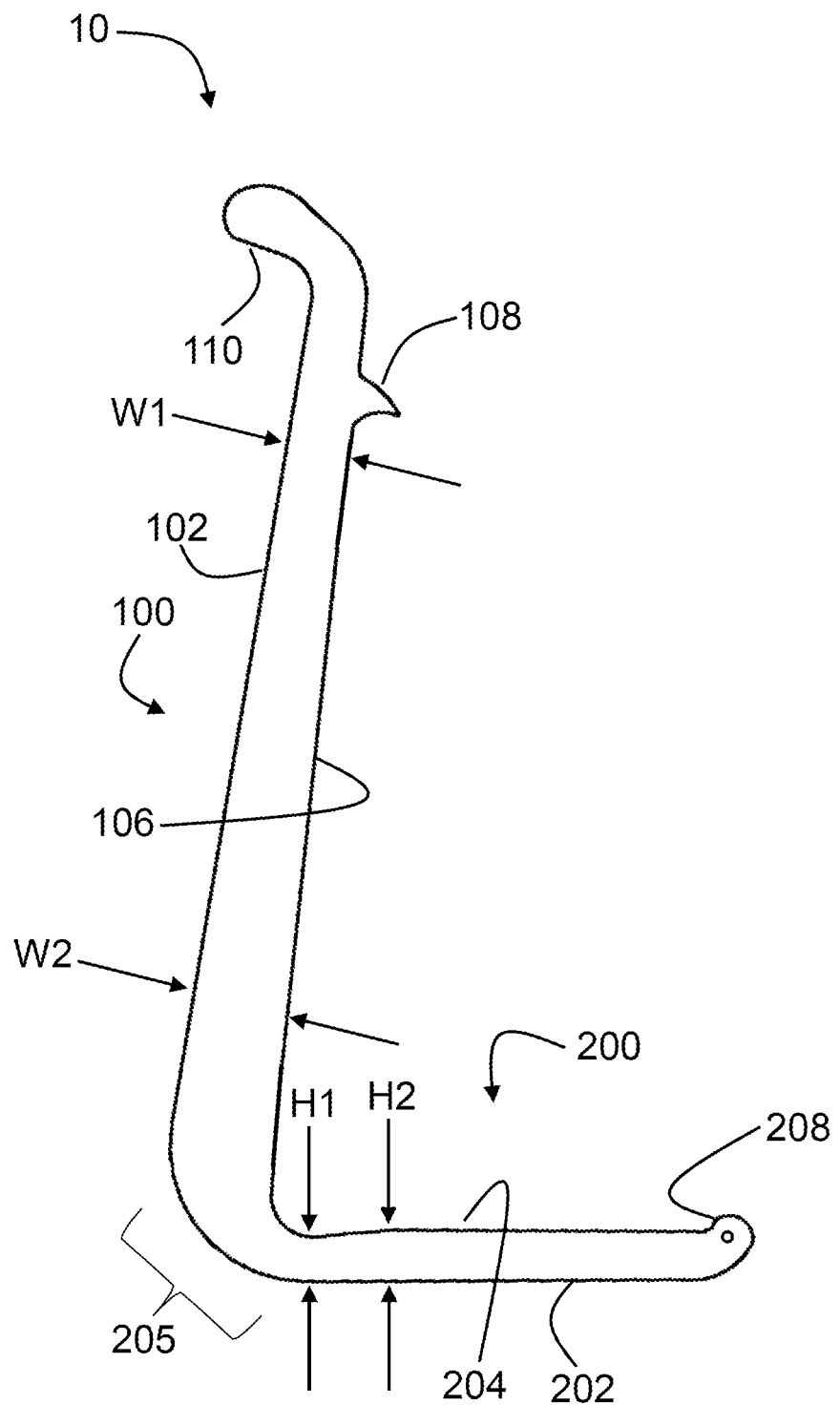
FIG. 3 shows aspects of an equipment loading assembly according to exemplary embodiments hereof.

In some embodiments as shown in FIG. 3, the width W1 of an upper portion of an upright arm 202 is less than a width W2 of the arm 202 towards its bottom end. In some embodiments, the width of the upright arm 202 tapers outward linearly from an upper portion (with width W1) to a lower portion (with width W2). However, in other embodiments, the outward tapering may include other types of curvatures and may not necessarily be linear.

In some embodiments as shown in FIGS. 1-2, the lower support structure 200 includes one or more lower support arms 202, with each lower support arm coupled with a lower portion (and preferably the bottom) of a corresponding upright arm 102. For example, the proximal end of a lower support arm 202 may be attached to or integrally formed with the bottom of its corresponding support arm 202 and extend forward therefrom. An upright arm 102 and its associated lower support arm 202 may be formed as a single unit (e.g., during manufacturing), and/or formed separately and connected together.

In some embodiments, each lower support arm 202 extends forward generally perpendicular from its corresponding upright arm 102, but other angular orientations also may be used (e.g., 70°-110°). In this way, each combined upright arm 102 and lower support arm 202 may together generally form an "L" shape. With the side-by-side upper support arms 102 aligned parallel with one another, the corresponding lower support arms 202 also may be aligned parallel with respect to one another.

In some embodiments as shown in FIG. 3, the junction between an upright arm 202 and its associated lower support arm 202 includes a rear corner 205. In some embodiments, the rear corner 205 includes a convex curvature (rounded) with a corner radius of about 0.5" to 12.0", and preferably about 3" to 8", and more preferably about 5" to 6", and more preferably about 5.5". This rounded corner 205 may facilitate the rocking and/or rotating of the assembly 10 during use as will be described in further detail in other sections.

In some embodiments as shown in FIGS. 2-3, each lower support arm 202 includes a top side 204 adapted to engage with a lower portion of the equipment E (e.g., the equipment's bottom side) when in use. In some embodiments as shown in FIG. 3, a lower support arm 202 includes a height H1 adjacent the rear corner 205 that is less than the height 112 of the lower support arm 202 towards the distal end of the arm 202. This may form a cavity opposite the rear corner 205 that may receive a rear corner of the equipment E when in use.

In some embodiments as shown in FIG. 1, the lower support structure 200 includes a front handle 206 that extends between the distal ends of two side-by-side lower support arms 202. The front handle 206 may be coupled with the distal ends of the adjacent lower support arms 202 and hold them apart at a distance D2. Note that it may be preferable that the separation distance D2 between two adjacent lower arms 202 generally equals the separation distance D1 between the two corresponding and adjacent upright arms 102, but this may not be required.

In some embodiments as shown in FIGS. 1-2, the distal end of at least one lower support arm 202 (and preferably two adjacent support arms 202) includes an upward extending foot 208. Each foot 208 preferably extends forward at an upward angle (e.g., at approximately 45°) thereby forming a front end stop at the distal end of each lower support arm 202. In some embodiments, the front handle 206 is coupled with the foot 208 of each adjacent support arm 202 and extends therebetween. As will be described in other sections, the front feet 208 (and a portion of the handle 206) may be adapted to engage with and hold a lower front edge of the equipment E when in use.

FIG. 2 shows a side view of a general piece of equipment E resting on the loading assembly 10 when in use. For the purposes of this specification, the equipment E in FIG. 2 is represented as a block, but it is understood that the equipment E may take any form or shape as required by the equipment E, and that the assembly 10 may be adapted to support the equipment E as described herein. It also is understood that the scope of the assembly 10 is not limited in any way by the type or form of the equipment E that it may be used to support.

As shown in FIG. 2, the upright rear portion of the equipment E may engage with the front surface 106 of the upright arm 102 with the rear top edge of the equipment E engaged beneath the stop 108. The bottom surface of the equipment E may engage with the top surface 204 of the lower support arm 202 and the front lower edge of the equipment E may be engaged behind the front foot 208. In this configuration, the equipment E may be generally supported by the assembly 10 in a way that it may be loaded onto an upper platform (e.g., into a truck bed).

Figure 4:
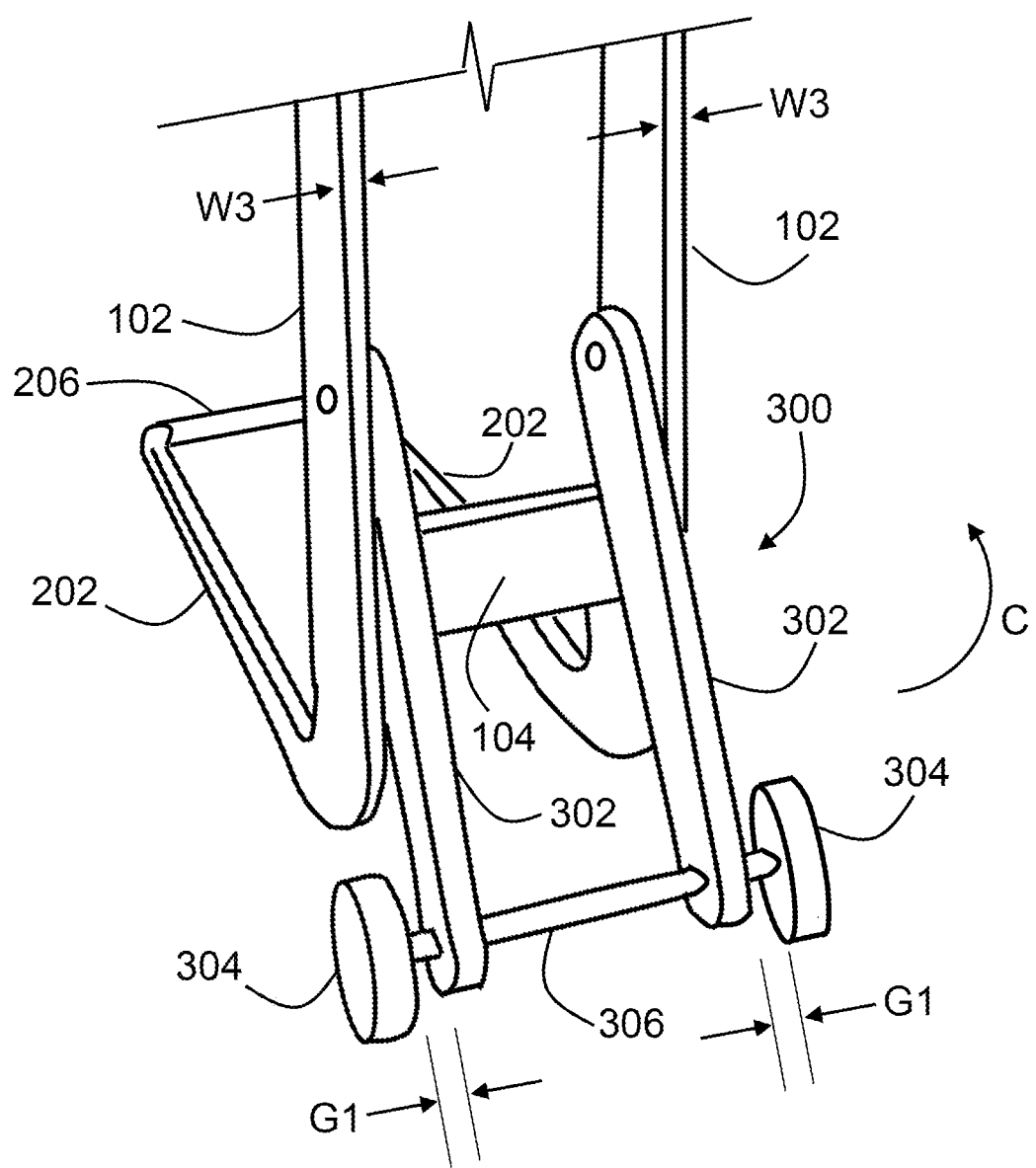
FIG. 4 shows aspects of a wheel support assembly configured with an equipment loading assembly according to exemplary embodiments hereof.

In some embodiments as shown in FIG. 4, the loading assembly 10 includes a wheel assembly 300 to facilitate the movement of the assembly 10 (and any equipment E held by the assembly 10) along the ground or on other surfaces.

In some embodiments as shown in FIG. 4, the wheel assembly 300 includes a first wheel support arm 302 coupled to a first upright support arm 202, and a second wheel support arm 302 coupled to a second upright support arm 202. Each wheel support arm 302 includes a proximal end rotatably coupled to an associated upright support arm 202 (e.g., by a bolt, pin or similar) and a distal end extending downward therefrom. As shown, it is preferable that the wheel support arms 302 are coupled to the inner surfaces of the associated upright support arms 102, but this may not be necessary.

In some embodiments as shown in FIG. 4, an axle 306 is configured with (e.g., passes through with or without bearings) the distal ends of the first and second wheel support arms 302. A first wheel 304 is coupled to a first end of the axle 306 (preferably adjacent the outside surface of the associated first wheel support arm 302) and a second wheel 304 is coupled to a second end of the axle 306 (preferably adjacent the outside surface of the associated second wheel support arm 302). In some embodiments, the first and second wheels 304 are rotatably coupled to the first and second ends of the axle 306, respectively, so that the wheels 304 may rotate with respect to the axle 306 (with or without bearings). In other embodiments, the axle 306 is adapted to rotate with respect to the first and second wheel support arms 302 so that the axle 306 and the first and second wheels 304 may rotate together. Any combinations thereof also are contemplated.

In some embodiments as shown in FIG. 4, the wheels 304 are coupled with respective ends of the axle 306 leaving a gap G1 between each wheel 304 and the outside surface of the associated wheel support arm 302. In addition, the wheel assembly 300 is adapted to be rotated upward in the direction of the arrow C for stowage. As the wheel assembly 300 is rotated fully upward so that it engages the first and second upright support arms 102, the respective upright support arms 102 (with widths W3) may fit into the respective gaps G1. It may be preferable that the widths W3 of each upright support arm 102 is generally equal to the gaps G1 so that the upright support arms 102 fit snugly within each associated gap G1, thereby removably holding the wheel assembly 300 in place.

Accordingly, the wheel assembly 300 may be placed in its generally downward position with its wheels 304 engaging the ground for use in rolling the assembly 10, and then placed in its upright position with the upright arms 102 held within the associated gaps G1 for stowage.

To roll the loading assembly 10 using the wheel assembly 300, the wheel assembly 300 may be placed in its downward position and the loading assembly 10 may be rotated backwards over the wheels 304 until its center of gravity is balanced. During this process, the user of the assembly 10 may place his/her foot on the axle 306 to hold the assembly 10 in place, and then release his/her foot from the axle 306 to roll the loading assembly 10 upon the ground.

In Use

The loading of the equipment E onto the assembly 10, and the subsequent loading of the assembly 10 onto a platform P will now be described with reference to FIGS. 5-8.

In some embodiments, the equipment E may include wheels (or feet) on its bottom portion (e.g., at each bottom corner) so that when the equipment E is placed on the ground, a gap between the ground and the equipment's wheels is formed. In this scenario, the equipment E may be loaded onto the assembly 10 by sliding the lower support arms 202 through this gap and between the equipment's E's wheels from the back of the equipment E to its front. Alternatively, the equipment E may be rolled onto the lower support arms 202. In this embodiment, it is preferable that the distance D2 (see FIG. 1) be less than the distance between the equipment's bottom left and right wheels so that the side-by-side lower support arms 202 may fit therebetween. In other embodiments, if the equipment E does not include bottom side wheels, the equipment E may be lifted and placed onto the lower support arms 202 as necessary.

It is understood that the acts described above to load the equipment E onto the assembly 10 are for demonstration and that the equipment E may be loaded onto the assembly 10 using any adequate techniques.

Once loaded, the back side of the equipment E is engaged with the front sides 106 of the upright arms 102 with the upper back edge of the equipment E positioned below the stops 108. The bottom of the equipment E is supported by the top surfaces 204 of the lower support arms 202 with the lower front edge of the equipment E positioned behind the front feet 208 and the front handle 206.

Figure 5:
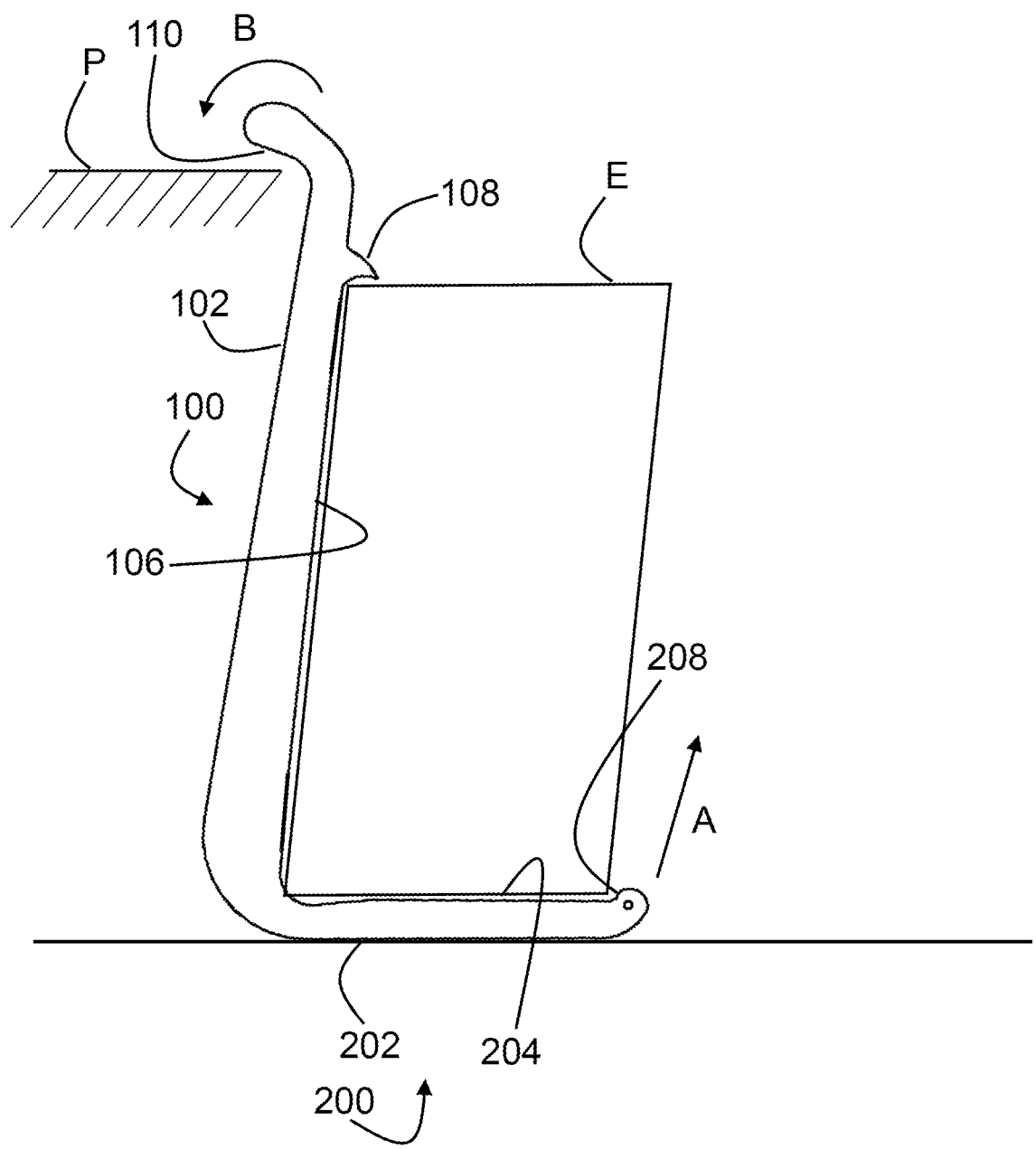
FIG. 5 shows aspects of an equipment loading assembly in use according to exemplary embodiments hereof.

As shown in FIG. 5, in preparation to be loaded onto an upper platform P, the back of the assembly 10 is positioned immediately adjacent the upper platform P. It is preferable that the height H (see FIG. 2) of the upright arms 102 be chosen so that the rear extending levers 110 are positioned above the top surface of the platform P as shown.

Figure 6:
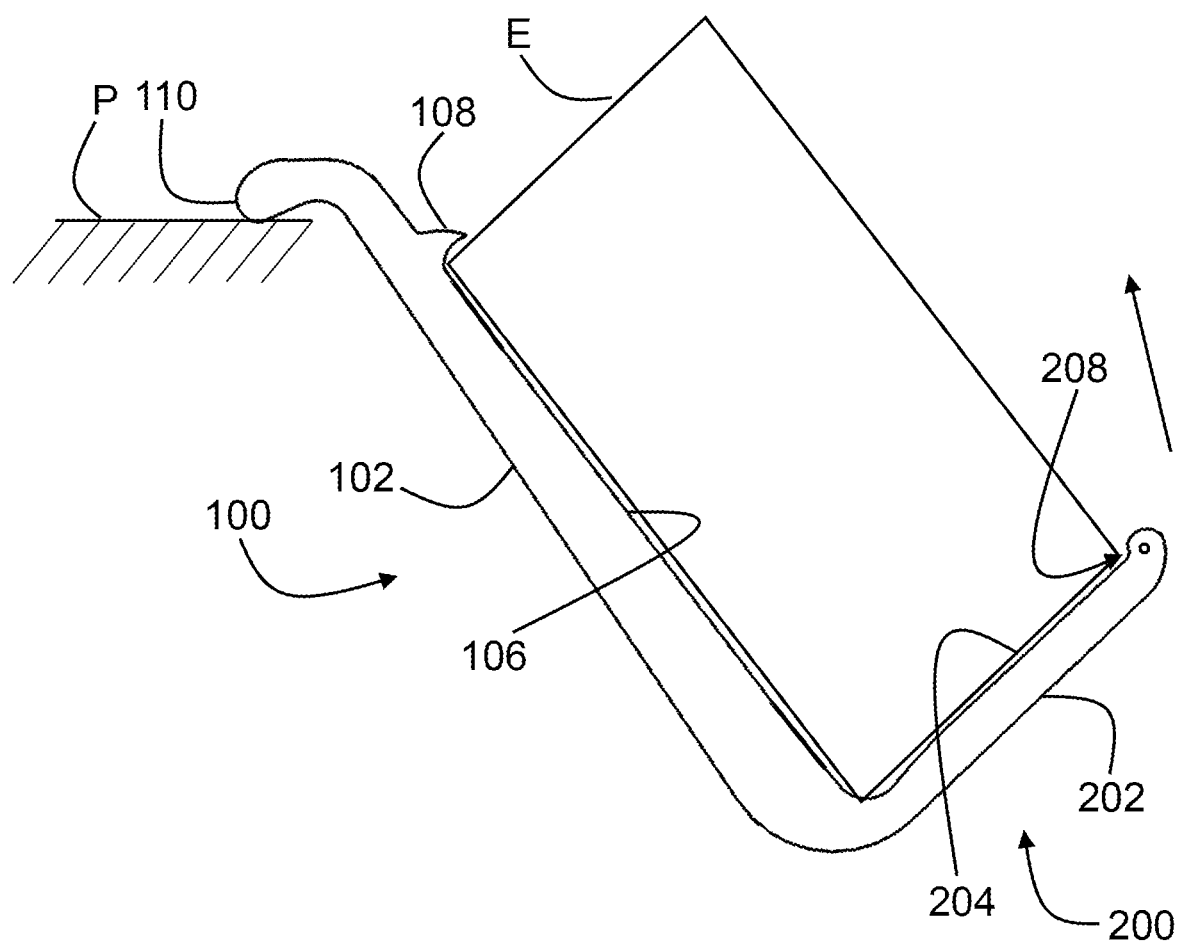
FIG. 6 shows aspects of an equipment loading assembly in use according to exemplary embodiments hereof.
Figure 7:
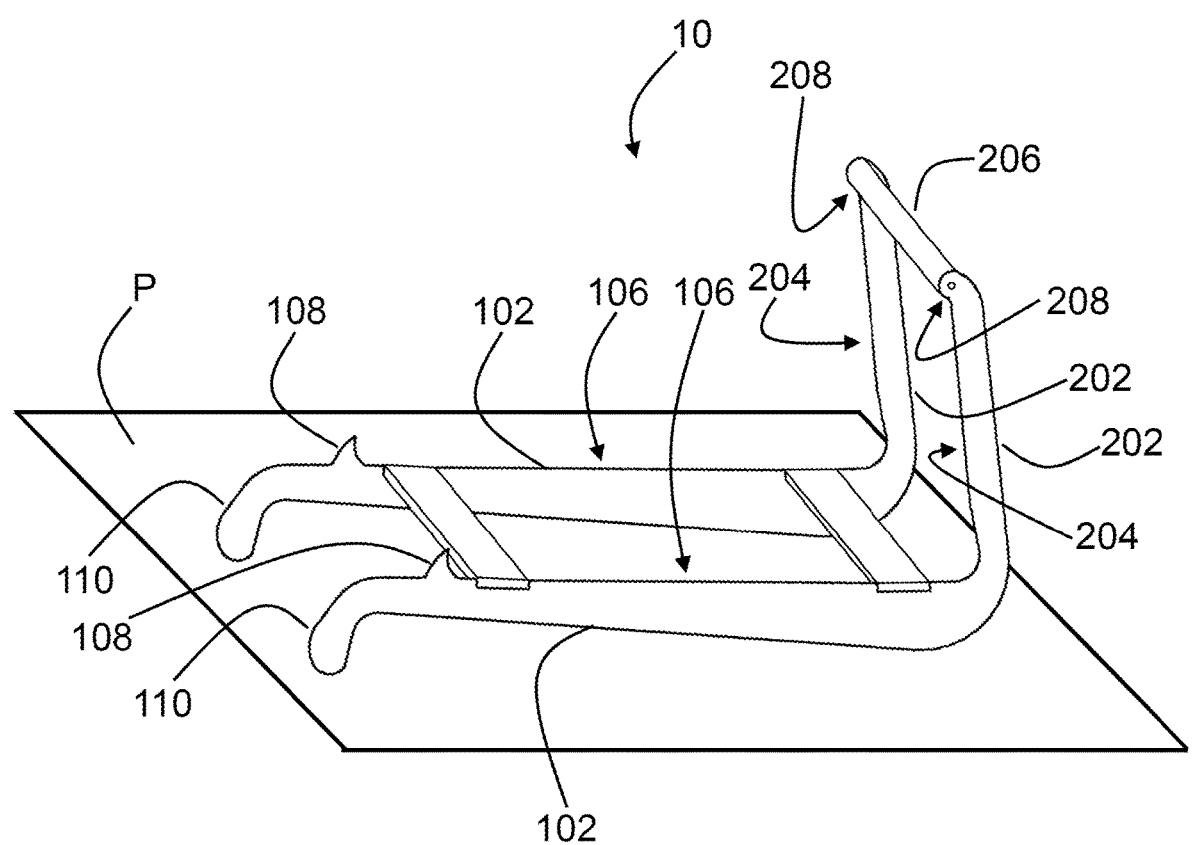
FIG. 7 shows aspects of an equipment loading assembly in use according to exemplary embodiments hereof.

With the assembly 10 and equipment E in this position, a user may grasp the front handle 206 and lift the assembly 10 upward in the direction of arrow A as shown in FIG. 5. During this motion, the lower support arms 202 may pivot upward and the rear extending levers 110 may pivot downwards (e.g., in the direction of the arrow B) until they engage with the top of the platform P. This is shown in FIG. 6. The back side of the equipment E may continue to rest against the front side 106 of the upright arms 102 and may be held in position by the stops 108. The bottom side of the equipment E may continue to rest on the top sides 204 of the lower support arms 202 and may be held in position by the front feet 208 (and the back portion of the front handle 206).

Once the rear extending levers 110 engage with the top surface of the platform P, further lifting of the handle 206 upward causes the assembly 10 to be raised off of the ground and to rotate about the pivot point (the point of engagement) between the levers 110 and the platform P. This motion may continue until the upright support arms 102 are high enough (e.g., level with the top of the platform P) that they may be pushed towards the platform P and caused to slide onto the platform's P's top surface. Further pushing may cause the assembly 10 and the equipment E to be moved onto the platform P resulting in the configuration shown in FIG. 7. Note that the equipment E is not shown in FIG. 7 for clarity of the assembly's components.

Figure 8:
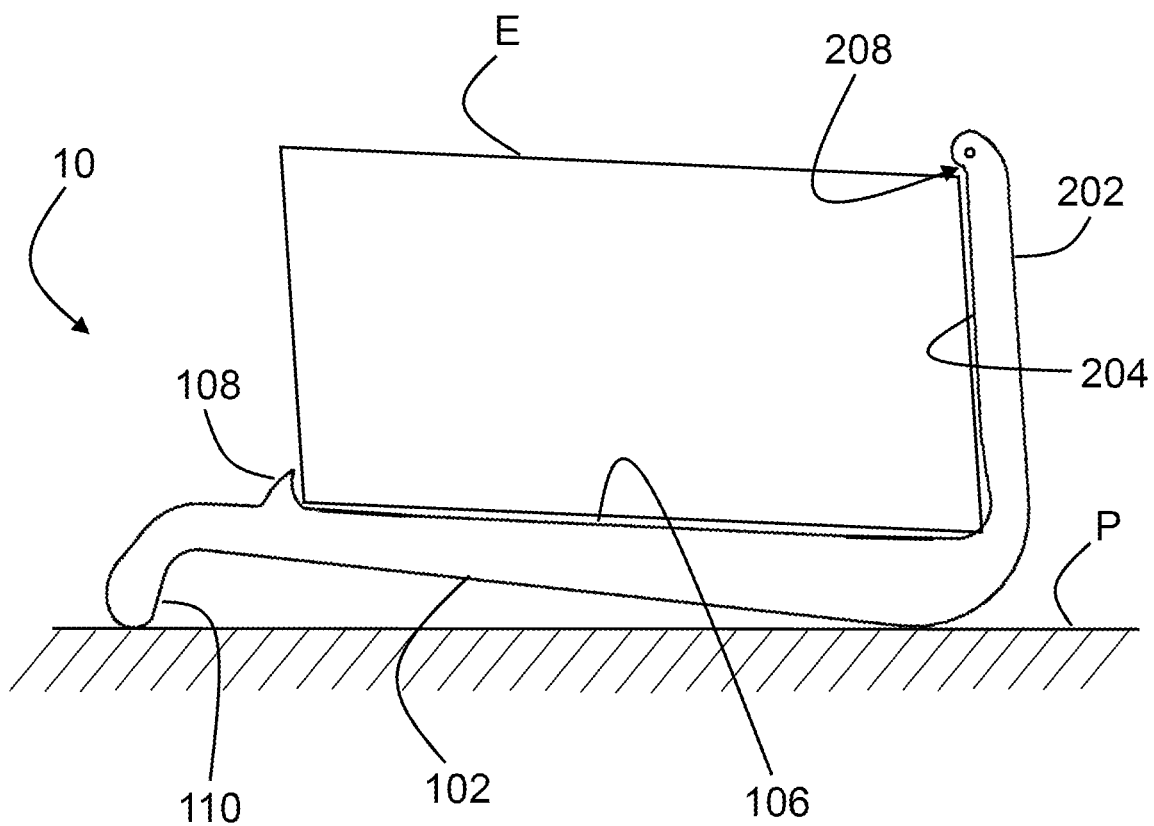
FIG. 8 shows aspects of an equipment loading assembly in use according to exemplary embodiments hereof.

In this configuration as shown in FIG. 8 (with the equipment E), the assembly's top levers 110 and lower portions of the upright support arms 102 may rest on the top surface of the platform P, and the equipment E may rest on the front sides 106 of the support arms 102. The equipment E may be held secure in the horizontal plane between the stops 108 and the lower support arms 202, and in the vertical plane by the upright support arms 102 and the feet 208 (and a portion of the handle 206). Optionally, one or more attachment straps that extend around the loading assembly 10 and the equipment E may be used to provide additional support to the equipment E during use.

In some embodiments, to remove the assembly 10 and the equipment E from the platform P, the acts described above may be performed in reverse order.

It is understood that the actions described above are meant for demonstration and that additional actions may be performed, not all of the described actions may be performed, and the actions may be taken in different orders. It also is understood that the scope of the assembly 10 is not limited in any way by the actions taken during its use.

In some embodiments as shown in FIG. 2, the height H1 of the assembly 10 is about 30" to 50", and preferably about 41" (or specifically, 41.16"). The length L of a lower support arm 202 is 15" to 25", and preferably about 21" (or specifically, 21.25"). In some embodiments as shown in FIG. 1, the distance D1 between the adjacent upright support arms 102 is about 6" to 10", and preferably about 7" to 8" (or specifically, 7.6"). In some embodiments as shown in FIG. 1, the distance D2 between the adjacent lower support arms 202 is about 6" to 10", and preferably about 7" to 8" (or specifically, 7.6"). Adding the width of each lower support arm 202 to D1 and/or D2 results in an overall width of the assembly 10 of about 8" (or specifically, 8.35").

It is understood that any aspect and/or element of any embodiment of the assembly 10 described herein or otherwise may be combined in any way with any other aspect and/or element of any other embodiment to form additional embodiments of the assembly 10 all of which are within the scope of the assembly 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent, or similar purpose can replace features disclosed in the specification, unless stated otherwise. Thus, unless stated otherwise, each feature disclosed represents one example of a generic series of equivalent or similar features.

The present invention also covers the exact terms, features, values, and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A loading assembly comprising:
   a first upright support arm including a first end and a second end, and a second upright support arm including a third end and a fourth end, the first and second upright support arms coupled together by at least one connection beam;
   a first rear facing lever coupled to the first end of the first upright support arm, and a second rear facing lever coupled to the third end of the second upright support arm;
   a first stop coupled with a forward facing surface of the first upright support arm and located towards the first upright support arm's first end, and a second stop coupled with a forward facing surface of the second upright support arm and located towards the second upright support arm's third end;
   a first lower support arm including a first proximal end and a first distal end, the first proximal end coupled to the second end of the first upright support arm, and a second lower support arm including a second proximal end and a second distal end, the second proximal end coupled to the fourth end of the second upright support arm;
   a first rear facing convex surface at a junction of the first upright support arm and the first lower support arm and/or a second rear facing convex surface at a junction of the second upright support arm and the second lower support arm, the first and/or second rear facing convex surfaces having a corner radius of at least 4 inches;
   a first foot coupled to the first distal end of the first lower support arm and extending upward, and a second foot coupled to the second distal end of the second lower support arm and extending upward; and
   a handle coupled between the first foot and the second foot;
   wherein the loading assembly is adapted to receive a piece of equipment onto its first and second lower support arms.

2. The loading assembly of claim 1 wherein the first lower support arm extends away from the first upright support arm at an angle of 70° to 110° with respect to the first upright support arm, and/or the second lower support arm extends away from the second upright support arm at an angle of 70° to 110° with respect to the second upright support arm.

3. The loading assembly of claim 1 wherein the first and second upright support arms are aligned and parallel with respect to one another.

4. The loading assembly of claim 1 wherein the first upright support arm includes a first width towards its first end and a second width towards its second end and the second width is greater than the first width, and/or the second upright support arm includes a third width towards its third end and a fourth width towards its fourth end and the fourth width is greater than the third width.

5. The loading assembly of claim 1 wherein the first lower support arm includes a first height towards its first proximal end and a second height towards its first distal end and the second height is greater than the first height, and/or the second lower support arm includes a third height towards its second proximal end and a fourth height towards its second distal end and the fourth height is greater than the third height.

6. The loading assembly of claim 5 wherein the first height forms a first cavity opposite the first rear facing convex surface, and the third height forms a second cavity opposite the second rear facing convex surface.

7. The loading assembly of claim 1 further comprising a wheel assembly coupled to the first upright support arm and/or the second upright support arm.

8. The loading assembly of claim 7 wherein the wheel assembly includes:
   a first wheel support arm including a first proximal end rotatably coupled to the first upright support arm and a first distal end extending away from the first upright support arm;
   a first wheel rotatably coupled to the first distal end;
   a second wheel support arm including a second proximal end rotatably coupled to the second upright support arm and a second distal end extending away from the second upright support arm; and
   a second wheel rotatably coupled to the second distal end;
   wherein the first and second wheel support arms are adapted to transition from a lower position that places the first and second wheels in engagement with a ground surface to an upper position that places the first and second wheels in non-engagement with the ground surface.

9. The loading assembly of claim 8 wherein the first and second wheels are rotatably coupled to the first and second distal ends of the first and second wheel support arms, respectively, by an axle.

10. The loading assembly of claim 8 wherein the first wheel is separated from an outer surface of the first distal end of the first wheel support arm by a first gap, and/or the second wheel is separated from an outer surface of the second distal end of the second wheel support arm by a second gap, wherein the first gap substantially equals a first width of the first upright support arm, and/or the second gap substantially equals a second width of the second upright support arm.

11. The loading assembly of claim 10 wherein the upper position of the first wheel support arm places the first width of the first upright support arm within the first gap, and/or the upper position of the second wheel support arm places the second width of the second upright support arm within the second gap.

12. A loading assembly comprising:
a first upright support arm including a first end and a second end, and a second upright support arm including a third end and a fourth end, the first and second upright support arms coupled together by at least one connection beam;
a first rear facing lever coupled to the first end of the first upright support arm, and a second rear facing lever coupled to the third end of the second upright support arm;
a first stop coupled with a forward facing surface of the first upright support arm and located towards the first upright support arm's first end, and a second stop coupled with a forward facing surface of the second upright support arm and located towards the second upright support arm's third end;
a first lower support arm including a first proximal end and a first distal end, the first proximal end coupled to the second end of the first upright support arm, and a second lower support arm including a second proximal end and a second distal end, the second proximal end coupled to the fourth end of the second upright support arm;
a handle coupled between the first distal end of the first lower support arm and the second distal end of the second lower support arm;
a wheel assembly comprising:
a first wheel support arm including a first proximal end rotatably coupled to the first upright support arm and a first distal end extending away from the first upright support arm;
a first wheel rotatably coupled to the first distal end;
a second wheel support arm including a second proximal end rotatably coupled to the second upright support arm and a second distal end extending away from the second upright support arm; and
a second wheel rotatably coupled to the second distal end;
wherein the first and second wheel support arms are adapted to transition from a lower position that places the first and second wheels in engagement with a ground surface to an upper position that places the first and second wheels in non-engagement with the ground surface;
wherein the loading assembly is adapted to receive a piece of equipment onto its first and second lower support arms.

13. The loading assembly of claim 12 further comprising a first foot coupled to the first distal end of the first lower support arm and extending upward, and a second foot coupled to the second distal end of the second lower support arm and extending upward.

14. The loading assembly of claim 12 wherein the first lower support arm extends away from the first upright support arm at an angle of 70° to 110° with respect to the first upright support arm, and/or the second lower support arm extends away from the second upright support arm at an angle of 70° to 110° with respect to the second upright support arm.

15. The loading assembly of claim 12 further comprising a first rear facing convex surface at a junction of the first upright support arm and the first lower support arm and/or a second rear facing convex surface at a junction of the second upright support arm and the second lower support arm, the first and/or second rear facing convex surfaces having a corner radius of at least 4 inches.

16. The loading assembly of claim 12 wherein the first lower support arm includes a first height towards its first proximal end and a second height towards its first distal end and the second height is greater than the first height, and/or the second lower support arm includes a third height towards its second proximal end and a fourth height towards its second distal end and the fourth height is greater than the third height.

17. The loading assembly of claim 16 further comprising a first rear facing convex surface at a junction of the first upright support arm and the first lower support arm and/or a second rear facing convex surface at a junction of the second upright support arm and the second lower support arm;
wherein the first height forms a first cavity opposite the first rear facing convex surface, and the third height forms a second cavity opposite the second rear facing convex surface.

18. The loading assembly of claim 12 wherein the first wheel is separated from an outer surface of the first distal end of the first wheel support arm by a first gap, and/or the second wheel is separated from an outer surface of the second distal end of the second wheel support arm by a second gap, wherein the first gap substantially equals a first width of the first upright support arm, and/or the second gap substantially equals a second width of the second upright support arm.

19. The loading assembly of claim 18 wherein the upper position of the first wheel support arm places the first width of the first upright support arm within the first gap, and/or the upper position of the second wheel support arm places the second width of the second upright support arm within the second gap.

20. A loading assembly comprising:
a first upright support arm including a first end and a second end, and a second upright support arm including a third end and a fourth end, the first and second upright support arms coupled together by at least one connection beam;
a first rear facing lever coupled to the first end of the first upright support arm, and a second rear facing lever coupled to the third end of the second upright support arm;
a first stop coupled with a forward facing surface of the first upright support arm and located towards the first upright support arm's first end, and a second stop coupled with a forward facing surface of the second upright support arm and located towards the second upright support arm's third end;
a first lower support arm including a first proximal end and a first distal end, the first proximal end coupled to the second end of the first upright support arm, and a second lower support arm including a second proximal end and a second distal end, the second proximal end coupled to the fourth end of the second upright support arm;

a first foot coupled to the first distal end of the first lower support arm and extending upward, and a second foot coupled to the second distal end of the second lower support arm and extending upward; and a handle coupled between the first foot and the second foot;

wherein the first lower support arm includes a first height towards its first proximal end and a second height towards its first distal end and the second height is greater than the first height, and/or the second lower support arm includes a third height towards its second proximal end and a fourth height towards its second distal end and the fourth height is greater than the third height;

wherein the loading assembly is adapted to receive a piece of equipment onto its first and second lower support arms.

* * * * *